United States Patent

[11] 3,590,709

| | | |
|---|---|---|
| [72] | Inventor | Nobunao Mikami<br>Kawasaki-shi, Japan |
| [21] | Appl. No | 757,592 |
| [22] | Filed | Sept. 5, 1968 |
| [45] | Patented | July 6, 1971 |
| [73] | Assignee | Kabushiki Kaisha Ricoh<br>Tokyo, Japan |
| [32] | Priority | Sept. 11, 1967 |
| [33] | | Japan |
| [31] | | 42/58221 |

[54] MULTIPHOTOGRAPHING DEVICE
7 Claims, 5 Drawing Figs.

[52] U.S. Cl. ................................................. 95/18, 95/36
[51] Int. Cl. .................................................. G03b 35/08
[50] Field of Search ........................................... 95/18, 36

[56] References Cited
UNITED STATES PATENTS
3,187,339  1/1965  Clay  ........  95/18 PX

*Primary Examiner*—John M. Horan
*Attorney*—Burgess, Ryan and Hicks

ABSTRACT: A first lens forms an image of an object at its object plane by focusing light through an aperture in a movable shield adjacent the first lens. The image is used as an object by a second lens which is comprised of an array of microlenses. The second lens focuses portions of the image upon a sensitive material at a plurality of sites which vary depending upon the placement of the aperture, which is movable between a plurality of nonoverlapping positions. The first lens is comprised of a plurality of lenses arrayed in a grid or lattice pattern and positioned with the centers of curvature of their light-transmitting surfaces on a common optical axis.

PATENTED JUL 6 1971 3,590,709

INVENTOR
NOBUNAO MIKAMI
BY Burgers, Ryan & Hicks
ATTORNEY

MULTIPHOTOGRAPHING DEVICE

BACKGROUND OF THE INVENTION

The present invention relates to a multiphotographing device and more particularly a multiphotographing device in which during an initial photographing operation an image of one object is divided into a plurality of small images which in turn are recorded upon a sensitive material at a first set of predetermined spaced portions thereof. In a similar manner during a subsequent photographing operation an image of another object is divided into a plurality of small images which in turn are recorded upon the same sensitive material at a second set of predetermined spaced portions thereof and so on.

As shown in FIG. 1, the optical system of the prior art photographing device is comprised of a relatively large objective first lens 1, a second lens 2 and a movable shield 3b defining an aperture 3 disposed immediately behind the first lens. The second lens 2 is comprised of a plurality of microlenses which are integrally formed and disposed so as to form a lattice consisting of rows and columns. Thus, the second lens serves to use the inverted image A produced by the first lens as an object, portions of which are focused as a plurality of images upon a photosensitive material 4 as real erect fragmentary images. The shield 3b is so arranged and disposed that the aperture 3 can be moved vertically and transversely in a plane which is substantially perpendicular with respect to the optical axis O of the first lens. Thus, the position of the aperture 3 serves to determine the position on the sensitive material 4 of each of the small images of portions of image A produced by the first lens.

The same result can be attained when the shield 3b defining the aperture 3 is arranged and disposed immediately before or within the first lens 1. Furthermore, the sensitive material 4 arranged and disposed behind the second lens 2 may either be disposed at the back surface of the second lens (if the back surface is the focal plane of the second lens) or may be spaced apart from the second lens 2 by a distance sufficient to place it in said focal plane.

When an inverted image A of an object is formed by the first lens between the first lens 1 and the second lens 2, an image A*aa* of a portion A*a* of the image A focused as erect image A*aa* upon the sensitive material 4 by one microlens element 2*a* of the second lens 2. In a similar manner, the light rays from another portion A*n* of the image A are made incident upon another microlens element 2*n* of the second lens 2 so as to focus upon the sensitive material an image A*na* of portion A*n* of image A.

When the aperture 3 is displaced to the position indicated by 3*a* and when the first lens 1 is directed toward another object, the image of the other object will be produced as shown by reference numeral B. An image B*aa* of one portion B*a* of the image B formed by the light rays coming from the aperture 3*a* is focused as an erect real image upon the sensitive material 4 through the above-described microlens element 2*a* of the second lens 2. In a similar manner, an erect, real image B*na* of another portion B*n* of the image B focused upon the sensitive material 4 by light from the aperture 3*a*.

Furthermore, when the aperture is displaced to an intermediate position between the positions 3 and 3*a*, the fragmentary images of the image produced by lens 1 are focused upon the unexposed portion of the sensitive material, that is the intermediate portion between the portions of the sensitive material which have been already exposed by the light rays coming through the aperture positions 3 and 3*a*. When the aperture is displaced after a photograph has been made, it is required that the position to which the aperture is displaced is not superimposed on a position at which the aperture has already been located once during a photographing operation.

In the photographing device of the type described above (shown in FIG. 1), the number of pictures which may be recorded is determined by the ratio of the total exposure area when the shield plate is removed to the exposure area of the aperture. That is, the number of pictures which may be photographed upon a single piece of sensitive material can be determined by the ratio of the effective area of the first lens located at the position of the aperture to the effective area of the aperture. Assuming that the effective diameter of the first lens at the position of the aperture is 30 mm. and its focal length 95 mm., the distance between the aperture and the image focused by the first lens is 80 mm., the distance between the image formed by the first lens and the second lens is 40 mm., the aperture is 2 mm. × 2 mm., and the displacement pitch both in the vertical and transverse directions is 3 mm., then 49 pictures can be photographed by displacing the aperture in seven steps in either directions.

The images of the objects obtained by the multiphotographing device of the type described above are distributed over a single sheet of sensitive material in the form of finely divided fragmentary images so that it is impossible to see what kind of objects are recorded thereupon by examining the sensitive material.

The recorded images can be reproduced with a projection optical system similar to the system of the multiphotographing device by reversing the light rays in direction. That is, by projecting light rays from the right of FIG. 1 through the sensitive material to lens 1.

The first lens must be made sufficiently large to include all the range through which the aperture moves vertically and transversely. Therefore, when the first lens is comprised of a better quality lens whose aberration is sufficiently corrected, the multiphotographing device becomes large in size and excessively heavy.

SUMMARY OF THE INVENTION

According to the present invention, the first lens is constituted of a plurality of small lenses arranged in rows and columns. Each of the small lenses of the first lens has the same radius of curvature and the centers of the curvature of all of the small lenses of the first lens lie close together on the optical axis. Therefore, the first lens is constituted of small lenses described above and arrayed substantially in the same plane, so that the surface of the first lens is in the form of scales. The surfaces of the adjacent small lenses may be considered as portions of a common spherical surface which have been displaced axially. The dimensions of the small lens constituting the first lens may be arbitrarily selected, but in order that each of the small lenses may be utilized in a very efficient and effective manner, preferably the dimensions of the small lenses of the first lens may be substantially similar to those of a movable aperture which is adapted to cooperate with the first lens, and furthermore it is preferable that the aperture which is displaced from one position to another when a photograph has been made be located immediately behind one of the small lenses of the first lens.

The first lens consisting of a plurality of small lenses of the type described hereinabove may be formed by, for example, molding a suitable synthetic resin or the like, so that the first lens according to the present invention is very light in weight and well suited for mass production.

Therefore, one of the objects of the present invention is to provide a multiphotographing device which can be manufactured inexpensively.

Another object of the present invention is to provide a multiphotographing device which is light in weight.

A still another object of the present invention is to provide a first lens for use in a multiphotographing device which can function in the most effective manner for each position of a movable aperture.

The above and other objects and advantages of the present invention will become apparent from the following description thereof when read in the light of the accompanying drawing.

DESCRIPTION OF THE PREFERRED EMBODIMENT

Figure 1:
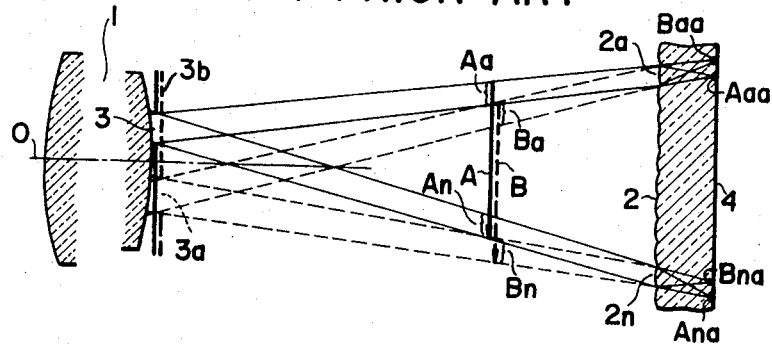
FIG. 1 is a schematic explanatory view of a conventional prior art multiphotographing device.
Figure 2:
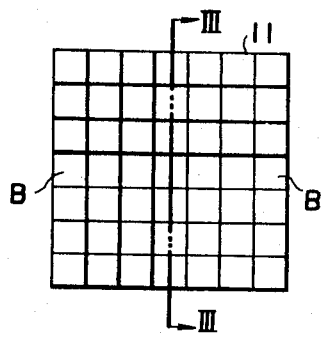
FIG. 2 is a front view of a first lens according to the present invention.
Figure 3:
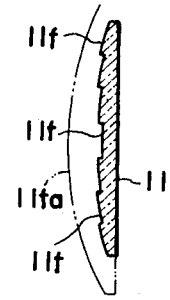
FIG. 3 is a sectional view taken along the line A-A of FIG. 2.
Figure 4:
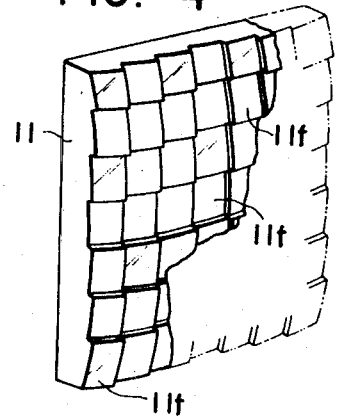
FIG. 4 is a perspective view of the first lens shown in FIG. 3.
Figure 5:
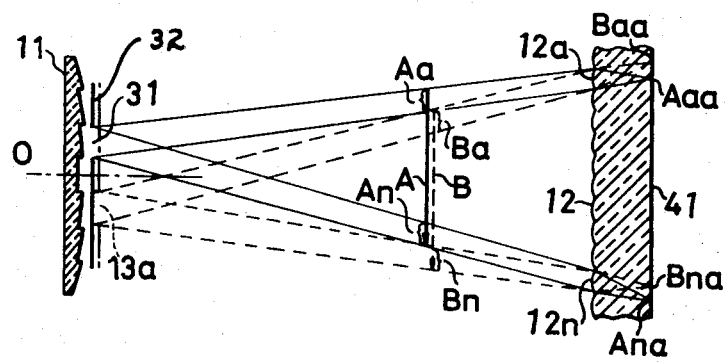
FIG. 5 is a schematic explanatory view of the invention.

FIGS. 2 to 5 illustrate a first lens which can be utilized in the present invention instead of a first lens shown in FIG. 1. The first lens according to the present invention is designated in its entirety by 11 and is comprised of a plurality of small lenses 11f which are arrayed in rows and columns as shown in FIG. 1 and FIG. 4. Each of the small lenses 11f has an axis which is common to all of the small lenses 11f. Furthermore, the radii of curvature of all of the surfaces of the small lenses are same. Therefore, if the surfaces of the small lenses were suitably displaced laterally to the left in FIG. 3, they would lie on a common spherical surface indicated by the chain line 11fa in FIG. 3. A sectional view taken along the line B-B of FIG. 2 would be the same as that shown in FIG. 3. Therefore, the first lens is seen to be constituted of a plurality of scale-shaped square small lenses arrayed upon one transparent plate having a flat side. The dimensions of each small lens may be selected suitably, but in order to utilize such a small lens in a very efficient manner, preferably the dimensions of each small lens should be substantially same as those of a movable aperture which cooperates with the first lens 11 in such a manner that when the movable aperture is displaced from one position to another between successive photographs, the movable aperture is located immediately behind one small lens of the first lens 11. For example, when the aperture is so designed that it can move in seven steps in the vertical and transverse directions, respectively, then the first lens 11 should be constituted of 49 small lenses.

The first lens constituted of an assembly of small lenses may be, for example, formed by molding so that the first lens can be made very light in weight and at inexpensive manufacturing cost.

The present invention has been described in detail hereinabove with particular reference to one preferred embodiment thereof, but it will be understood that variations and modifications can be effected with the spirit and the scope of the present invention as described hereinabove and as defined in the appended claim.

I claim:

1. In a multiphotographing device having a first lens with an optical axis, a second lens located behind the first lens on the optical axis and comprised of a plurality of microlenses, means for supporting a photosensitive material in the focal plane of the microlenses, and blocking means for defining a movable aperture adjacent to the first lens in the light path extending from a subject being photographed through the first lens to the second lens, said aperture being movable between a plurality of nonoverlapping aperture positions and said blocking means occluding light paths from the subject through the first lens to the second lens, the improvement wherein the first lens comprises a planar array of small lens elements of identical radii of curvature, the centers of curvature of all said elements lying on the optical axis.

2. The device of claim 1 wherein a separate lens element is associated with each aperture position and is so located that only light from said separate lens element passes through the aperture when it is in said aperture position.

3. The device of claim 1 wherein the first lens comprises a plane surface defining one side of said lens and a composite surface defining the other side of said lens, said composite surface being comprised of a plurality of spherical surfaces substantially equidistant from the plane surface.

4. The device of claim 2 wherein the first lens comprises a plane surface defining one side of said lens and a composite surface defining the other side of said lens, said composite surface being comprised of a plurality of spherical surfaces substantially equidistant from the plane surface.

5. A multiphotographing device comprising:
a first lens having an optical axis and adapted to form an image of an object being photographed, said first lens comprising:
a plane surface,
a composite surface comprised of a plurality of contiguous spherical surfaces having the same radii of curvature and having centers of curvature on the optical axis, each said spherical surface being bounded by a rectangular border, said spherical surfaces all being substantially equidistant from the plane surface;
a movable shield adjacent the first lens positioned across the optical axis to occlude light passing through said first lens,
an aperture defined by the shield movable, upon motion of the shield, between a plurality of nonoverlapping aperture positions in the path of light traversing the first lens, each said aperture position being so located as to receive light from a single one of the spherical surfaces; and
a second lens comprised of a plurality of microlenses positioned on the optical axis to receive light from the first lens and focus said light on a second lens focal plane.

6. The device of claim 1 wherein the first lens is integrally formed of a single piece of transparent plastic material.

7. The device of claim 5 wherein the first lens is integrally formed of a single piece of transparent plastic material.